(12) United States Patent
Rho et al.

(10) Patent No.: US 12,591,079 B2
(45) Date of Patent: Mar. 31, 2026

(54) HUMIDITY SENSITIVE NANO-PHOTONICS AND MANUFACTURING METHOD THEREOF

(71) Applicant: POSTECH Academy-Industry Foundation, Pohang-si (KR)

(72) Inventors: Jun Suk Rho, Pohang-si (KR); Byoung Su Ko, Pohang-si (KR); Young Hwan Yang, Pohang-si (KR); Jae Kyoung Kim, Pohang-si (KR); Trevon Badloe, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 283 days.

(21) Appl. No.: 18/378,236

(22) Filed: Oct. 10, 2023

(65) Prior Publication Data

US 2024/0125974 A1 Apr. 18, 2024

(30) Foreign Application Priority Data

Oct. 12, 2022 (KR) ........................ 10-2022-0130474
Mar. 3, 2023 (KR) ........................ 10-2023-0028487

(51) Int. Cl.
*G02B 1/00* (2006.01)
*B82Y 20/00* (2011.01)
(Continued)

(52) U.S. Cl.
CPC .............. *G02B 1/002* (2013.01); *B82Y 20/00* (2013.01); *B82Y 40/00* (2013.01); *G02B 1/04* (2013.01);
(Continued)

(58) Field of Classification Search
CPC ........ G02B 5/008; G02B 1/002; G02B 1/007; G02B 26/06; G02B 1/005; G02B 5/1809;
(Continued)

(56) References Cited

U.S. PATENT DOCUMENTS

2010/0044837 A1* 2/2010 Schaper ................. B82Y 40/00
438/782
2018/0045953 A1* 2/2018 Fan ........................... G02B 5/18
(Continued)

OTHER PUBLICATIONS

Zhang et al. "Grayscale-patterned metal-hydrogel-metal microscavity for dynamic multi-color display" Nanophotonics, vol. 10, No. 16, 2021, pp. 4125-4131 (Year: 2021).*

*Primary Examiner* — Jonathan Y Jung
(74) *Attorney, Agent, or Firm* — LEX IP MEISTER, PLLC

(57) ABSTRACT

The present disclosure relates to humidity sensitive nano-photonics and a manufacturing method thereof, and more particularly to humidity sensitive nano-photonics including a metasurface and a method for manufacturing the same. The humidity sensitive nano-photonics and the manufacturing method thereof according to an embodiment of the present disclosure include a metasurface that are capable of expanding and contracting depending on changes in the relative humidity of the surrounding environment, and have the advantage of being easily manufactured, mass-produced at low cost, capable of effectively adjusting the phase and intensity of light, and applicable to various materials and various shapes of surfaces as well.

15 Claims, 13 Drawing Sheets

(51) Int. Cl.
    *B82Y 40/00*       (2011.01)
    *G02B 1/04*        (2006.01)
    *G02F 1/01*        (2006.01)
    *G03H 1/00*       (2006.01)

(52) U.S. Cl.
    CPC ......... *G02F 1/0113* (2021.01); *G03H 1/0005*
             (2013.01); *G02B 2207/101* (2013.01)

(58) Field of Classification Search
    CPC ..... G02B 1/04; G02B 2207/101; G02F 1/292;
             G02F 2202/30; B82Y 40/00; B82Y 20/00
    See application file for complete search history.

(56)               References Cited

U.S. PATENT DOCUMENTS

| | | | |
|---|---|---|---|
| 2019/0243237 A1* | 8/2019 | Watkins | C23C 18/1283 |
| 2021/0024143 A1* | 1/2021 | Li | F24S 70/20 |
| 2022/0013905 A1* | 1/2022 | Park | G02F 1/0147 |
| 2022/0404525 A1* | 12/2022 | Wolk | G02B 1/002 |
| 2024/0151971 A1* | 5/2024 | Vora | G02B 5/1866 |

* cited by examiner

FIG. 4

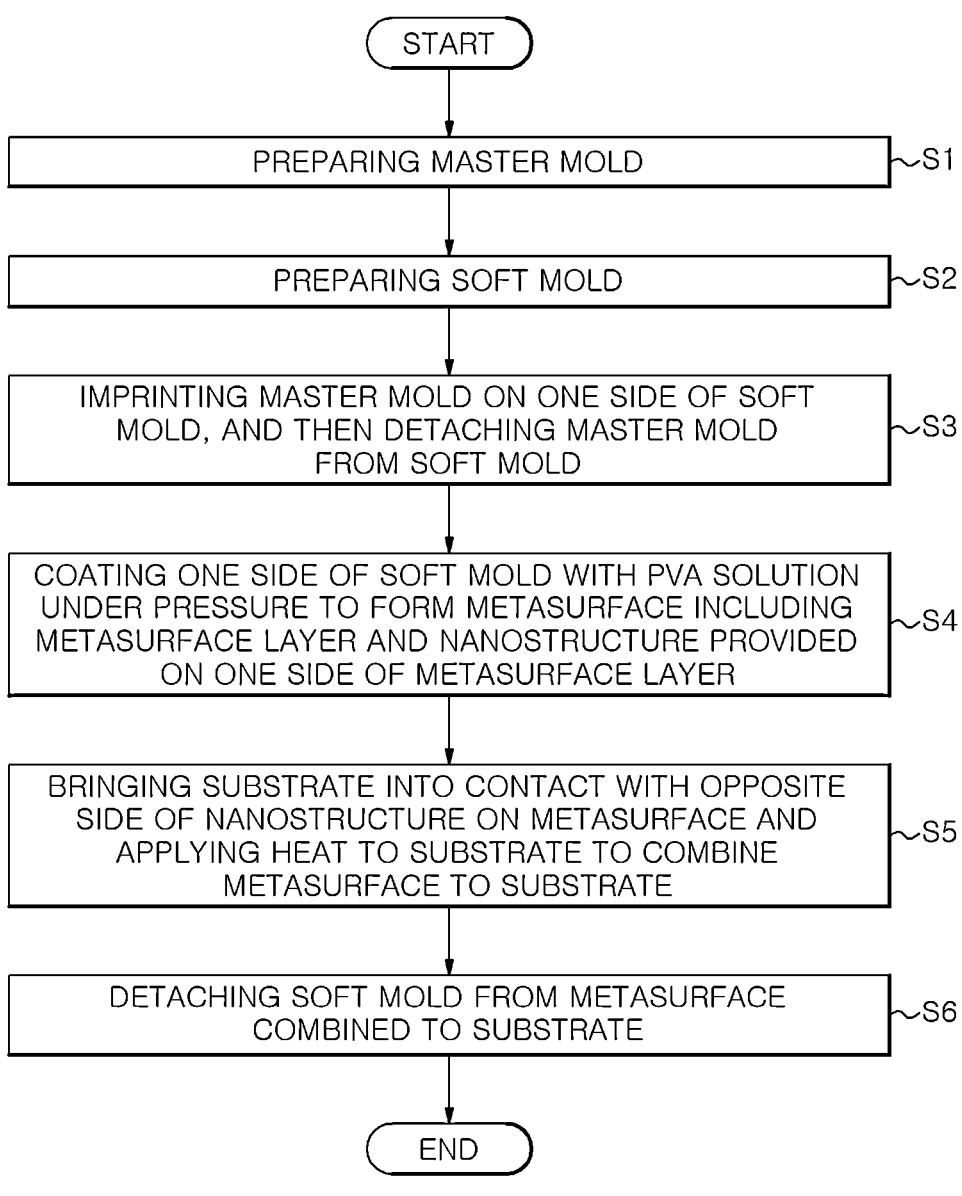

START

PREPARING MASTER MOLD ~S1

PREPARING SOFT MOLD ~S2

IMPRINTING MASTER MOLD ON ONE SIDE OF SOFT MOLD, AND THEN DETACHING MASTER MOLD FROM SOFT MOLD ~S3

COATING ONE SIDE OF SOFT MOLD WITH PVA SOLUTION UNDER PRESSURE TO FORM METASURFACE INCLUDING METASURFACE LAYER AND NANOSTRUCTURE PROVIDED ON ONE SIDE OF METASURFACE LAYER ~S4

BRINGING SUBSTRATE INTO CONTACT WITH OPPOSITE SIDE OF NANOSTRUCTURE ON METASURFACE AND APPLYING HEAT TO SUBSTRATE TO COMBINE METASURFACE TO SUBSTRATE ~S5

DETACHING SOFT MOLD FROM METASURFACE COMBINED TO SUBSTRATE ~S6

END

1100

HUMIDITY SENSITIVE NANO-PHOTONICS AND MANUFACTURING METHOD THEREOF

CROSS-REFERENCE TO RELATED APPLICATION(S)

This application is based on and claims priority of Korean Patent Application No. 10-2022-0130474, filed on Oct. 12, 2022 with the Korean Intellectual Property Office and Korean Patent Application No. 10-2023-0028487, filed on Mar. 3, 2023 with the Korean Intellectual Property Office, the entire contents of which are hereby incorporated by reference.

TECHNICAL FIELD

The present disclosure relates to humidity sensitive nano-photonics and a manufacturing method thereof, and more particularly to humidity sensitive nano-photonics including a metasurface, and a manufacturing method thereof.

BACKGROUND

In embodiments of the present disclosure, metamaterials may be understood as novel artificial materials containing both electrical and magnetic elements that do not exist in nature. The surface formed by such metamaterials is referred to as a meta-surface, and multiple nanoscale structures called meta-atoms are repeatedly placed on the meta-surface. The meta-atoms on the meta-surface can form geometric patterns.

Nano-photonics is an ultrathin optical device made by arranging structures smaller than light, and is capable of freely controlling the phase and intensity of the incident light by individual structures. By manufacturing optical devices that operate in the visible light region, a variety of optical devices can be developed, including ultrathin lenses, ultrathin holographic storage technologies, and structured colors. However, conventional optical devices have the desired optical properties due to the size, shape, and arrangement of the nanostructures that make them up, which makes it difficult to change their optical properties after they are manufactured.

Nano-photonics that can change its optical properties is called tunable nano-photonics. Recently, the development of tunable nano-photonics using liquid crystals, metals capable of controlling oxidation number, and the like has emerged. However, these materials are difficult to prefabricate and handle, resulting in a high barrier to entry for the use of these materials.

DOCUMENT OF RELATED ART

Patent Document

Patent document: Korean Patent Application Publication No. 10-2020-0125598

SUMMARY

An embodiment of the present disclosure, which has been conceived to address the problems described above, is to provide humidity sensitive nano-photonics and a manufacturing method thereof, which are capable of being easily manufactured, mass-produced at low cost, and effectively adjusting the phase and intensity of light.

According to an aspect of the present invention, there is provided a humidity sensitive nano-photonics, the humidity sensitive nano-photonics comprising: a substrate including a plurality of unit cells; and a metasurface including a metasurface layer disposed on one side of the substrate and a plurality of nanostructures provided on the metasurface layer and forming a geometric pattern, wherein one of the unit cells and at least one of the nanostructures corresponding to the unit cell together constitute a unit module; and wherein the height of the nanostructures is able to increase or decrease depending on ambient relative humidity.

Further, there is provided a humidity sensitive nano-photonics, wherein the metasurface is formed of polyvinyl alcohol (PVA) materials that expand or contract depending on the ambient relative humidity.

Further, there is provided a humidity sensitive nano-photonics, wherein the nanostructure is destroyed in an environment with a predetermined range of ambient relative humidity.

Further, there is provided a humidity sensitive nano-photonics, wherein the nanostructure is destroyed in an environment with ambient relative humidity of 80% or more.

Further, there is provided a humidity sensitive nano-photonics, wherein the nanostructure has an aspect ratio of 2.5 to 10.

Further, there is provided a humidity sensitive nano-photonics, wherein when the metasurface transmits light from a first light source, it may produce a preset holographic image; and when the metasurface reflects light from the second light source, it may produce a preset reflective image.

Further, there is provided a humidity sensitive nano-photonics, wherein the substrate is formed of hydrogenated amorphous silicon (a-Si:H) materials.

Further, there is provided a humidity sensitive nano-photonics, wherein the nanostructure is capable of repeatedly changing in height without being destroyed even in an environment with repeatedly changing relative humidity.

Further, there is provided a humidity sensitive nano-photonics, wherein an ultra-thin metal film is disposed on one side of the meta-surface layer, which is an opposite side of the substrate relative to the meta-surface layer; and the metal film is provided to surround the perimeter of the nanostructure.

Further, there is provided a humidity sensitive nano-photonics, wherein when the metasurface transmits light from a first light source, it may produce a preset holographic image; and when the metasurface reflects light from the second light source, it may produce a preset reflective image, and wherein one of the holographic image or the reflective image is decoded while the other is encoded under a first humidity range, and one of the holographic image or the reflective image is encoded while the other is decoded under a second humidity range;

Further, there is provided a humidity sensitive nano-photonics, wherein the first humidity range is a relative humidity range of 0 or more and less than 68, and the second humidity range is a relative humidity sensitive range of 68% or more and 80% or less.

Further, there is provided a humidity sensitive nano-photonics, further comprising: a mirror layer disposed between the substrate and the metasurface layer to reflect incident light; a partial reflective layer disposed on an end of the nanostructure opposite to the mirror layer to reflect a portion of the incident light and transmit the remaining portion, wherein in the unit module, the mirror layer and the partially reflective layer corresponding to the unit cell together constitute the unit module; different colors of light are outputted depending on ambient relative humidity when light is incident on the unit module.

Further, there is provided a humidity sensitive nano-photonics, wherein the mirror layer is made of aluminums (Al).

Further, there is provided a humidity sensitive nano-photonics, wherein the partial reflective layer is a silver nanoparticle coating layer.

Further, there is provided a humidity sensitive nano-photonics, wherein in the unit module, a wavelength of a outputted light covers a wavelength range of a full RGB gamut.

Further, there is provided a humidity sensitive nano-photonics, wherein in any two of the unit modules, the nanostructure of one of the unit modules and the nanostructure of the other of the unit modules have different heights when formed initially.

According to an aspect of the present invention, there is provided a manufacturing method of humidity sensitive nano-photonics, the manufacturing method of humidity sensitive nano-photonics comprising: a step S1 of preparing a master mold; a step S2 of preparing a soft mold; a step S3 of imprinting the master mold on one side of the soft mold, and then detaching the master mold from the soft mold; a step S4 of coating one side of the soft mold S with a polyvinyl alcohol (PVA) solution under pressure to form the metasurface including a metasurface layer and a nanostructure provided on one side of the metasurface layer; a step S5 of bringing a substrate into contact with the opposite side of the nanostructure on the metasurface and applying heat to the substrate to combine the metasurface to the substrate; and a step S6 of detaching the soft mold from the metasurface combined to the substrate.

Further, there is provided a manufacturing method of humidity sensitive nano-photonics, wherein in the step S2, the soft mold is made by forming a polydimethylsiloxane (PDMS) layer and a hard polydimethylsiloxane (h-PDMS) layer so that the h-PDMS layer is disposed on one side of the PDMS layer; and wherein the one side of the soft mold is oriented in the same direction as the one side of the PDMS layer.

Further, there is provided a manufacturing method of humidity sensitive nano-photonics, further comprising: after the step S6, a step S7 of disposing an ultra-thin metal film on the one side of the metasurface layer.

Further, there is provided a manufacturing method of humidity sensitive nano-photonics, further comprising: a step S8 of disposing a mirror layer on one side of the substrate; and a step S9 of disposing a partially reflective layer on an end of the nanostructure opposite to the mirror layer after the step S6, wherein the step S5 is a step of bringing the mirror layer into contact with the opposite side of the nanostructures of the metasurface, such that the mirror layer is disposed between the metasurface and the substrate, and then applying heat to the substrate, such that the metasurface is combined to the mirror layer.

According to an embodiment of the present disclosure, the humidity sensitive nano-photonics and the manufacturing method thereof include a metasurface that are capable of expanding and contracting depending on changes in the relative humidity of the surrounding environment, and have the advantage of being easily manufactured, mass-produced at low cost, capable of effectively adjusting the phase and intensity of light, and applicable to various materials and various shapes of surfaces as well.

In addition, according to an embodiment of the present disclosure, the humidity sensitive nano-photonics may be able of irreversibly or reversibly display or hide image information depending on conditions of the relative humidity of a surrounding environment, and may therefore be applicable to various technological fields such as smart labels, smart sensors, and optical security.

In addition, according to an embodiment of the present disclosure, the humidity sensitive nano-photonics may be capable of expressing colors in a full RGB gamut depending on changes in the relative humidity of a surrounding environment, and may therefore be applicable to the field of high-resolution flexible display technology.

BRIEF DESCRIPTION OF DRAWINGS

FIG. 4 is a flowchart illustrating a manufacturing method of the humidity sensitive nano-photonics according to the first embodiment of the present disclosure.

DETAILED DESCRIPTION OF EXEMPLARY EMBODIMENTS

Figure 1:
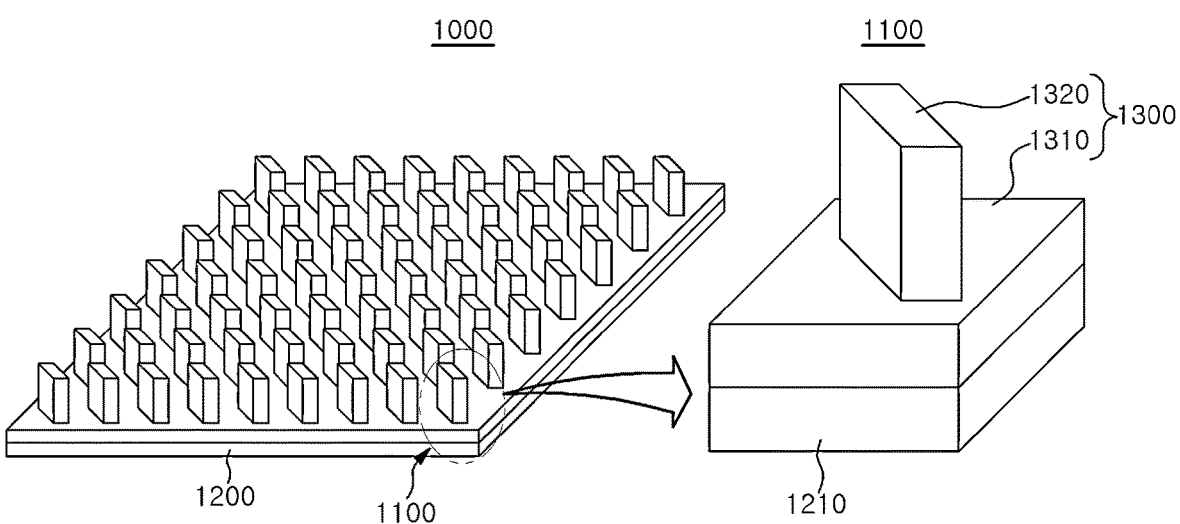
FIG. 1 is an enlarged perspective view of an overall shape and a unit module of humidity sensitive nano-photonics according to a first embodiment of the present disclosure.

Inasmuch as the present disclosure may have a variety of embodiments with a number of modifications, certain embodiments have been illustrated in the drawings and will be described in detail in the description that follows. It is to be understood, however, that the disclosure is not intended to be limited to the particular forms disclosed, but on the contrary, is intended to cover all modifications, equivalents, and alternatives falling within the spirit and scope of the disclosure.

The terms used herein are for the purpose of describing particular embodiments only and are not intended to limit the present disclosure. Singular expressions include plural expressions unless the context clearly indicates otherwise. In the present disclosure, the terms such as "comprise" or "include" are intended to indicate the presence of features, figures, steps, actions, components, parts, or any combination thereof described in the specification, but do not preclude the presence of or the possibility of addition of one or more other features, figures, steps, actions, components, parts, or any combination thereof.

Hereinafter, exemplary embodiments of the present disclosure will be described in detail with reference to the accompanying drawings. It should be noted that in the drawings, the same components are identified by the same reference symbols wherever possible. Further, the detailed description of known functions and configurations, which may obscure the essence of the present disclosure will be omitted. For the same reason, some of the components have been exaggerated, omitted or shown in a schematic manner in the accompanying drawings.

Figure 2:
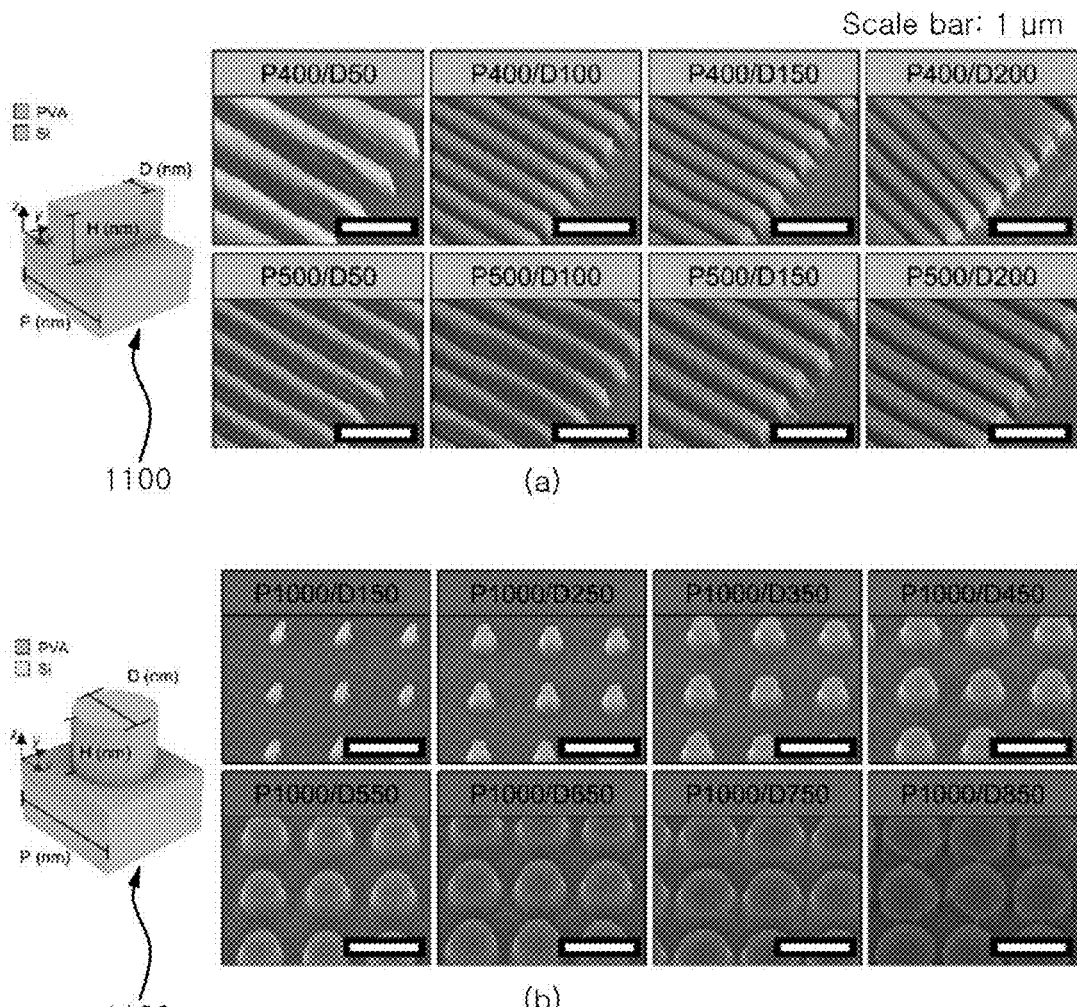
FIG. 2 is a partially enlarged view of a nanostructure of the humidity sensitive nano-photonics according to the first embodiment of the present disclosure.
Figure 3:
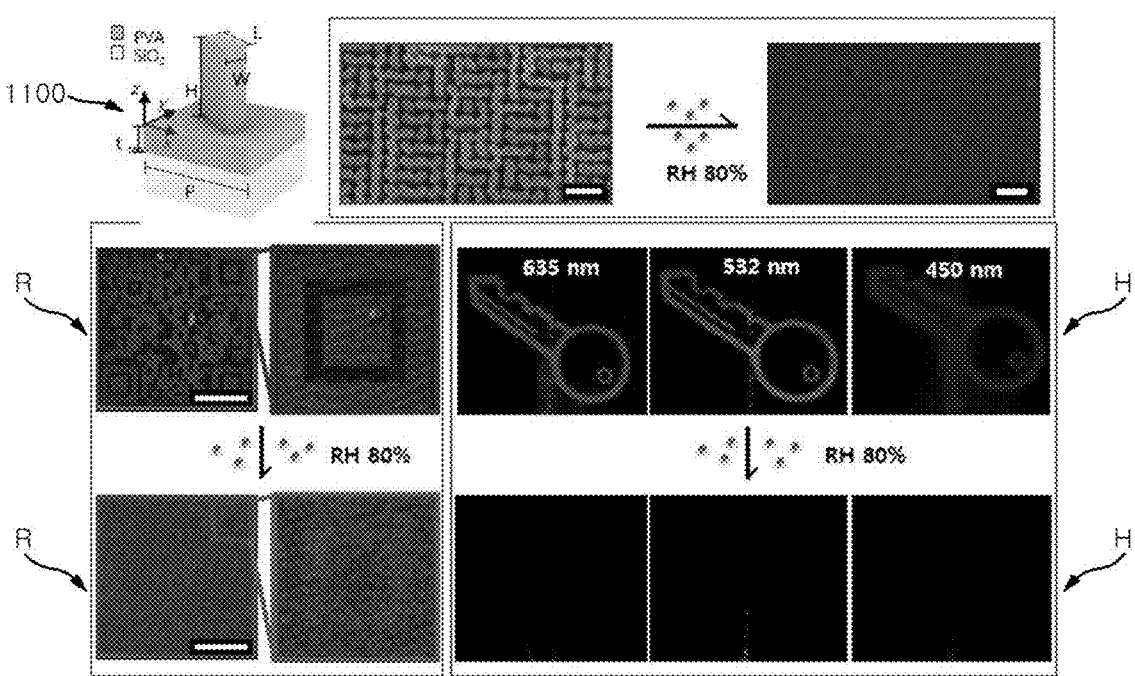
FIG. 3 is an example of a holographic image and a reflective image formed by the humidity sensitive nano-photonics according to the first embodiment of the present disclosure.
Figure 5:
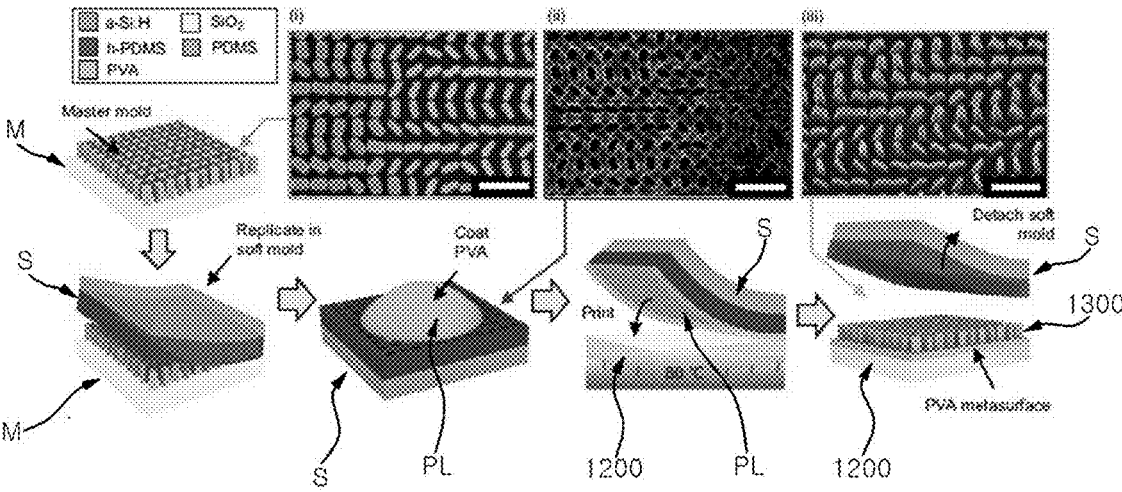
FIG. 5 is a conceptual diagram illustrating a manufacturing process of the humidity sensitive nano-photonics according to the first embodiment of the present disclosure.
Figure 6:
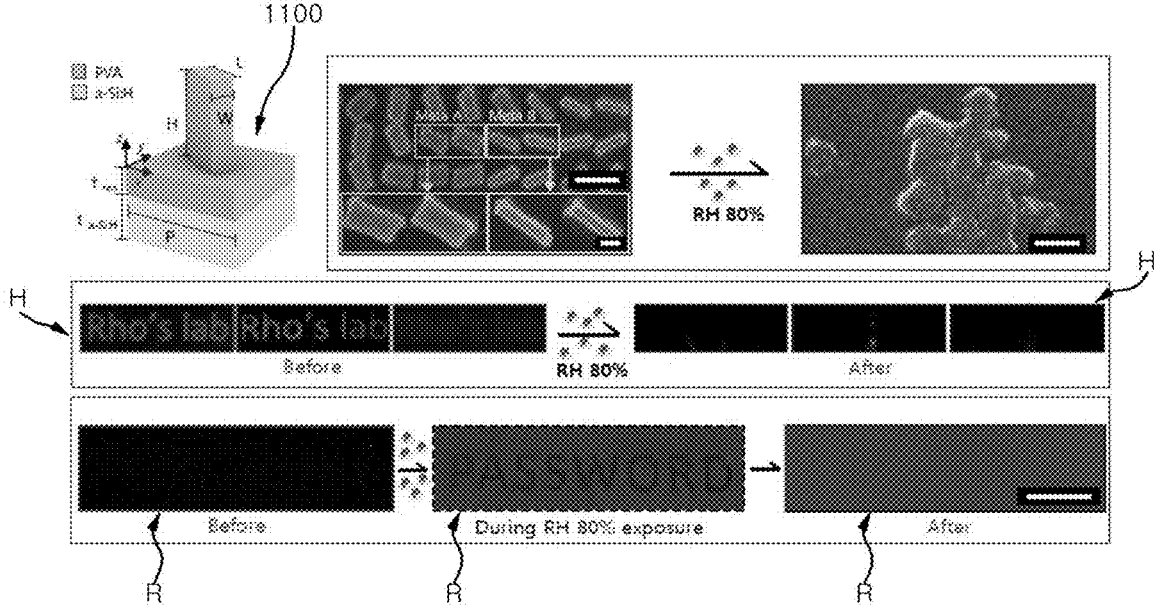
FIG. 6 is an example of a holographic image and a reflective image formed by humidity sensitive nano-photonics according to a modified example of the first embodiment of the present disclosure.

FIG. 1 is an enlarged perspective view of an overall shape and a unit module of humidity sensitive nano-photonics according to a first embodiment of the present disclosure; FIG. 2 is a partially enlarged view of a nanostructure of the humidity sensitive nano-photonics according to the first embodiment of the present disclosure; FIG. 3 is an example of a holographic image and a reflective image formed by the humidity sensitive nano-photonics according to the first embodiment of the present disclosure; FIG. 4 is a flowchart illustrating a manufacturing method of the humidity sensitive nano-photonics according to the first embodiment of the present disclosure; FIG. 5 is a conceptual diagram illustrating a manufacturing process of the humidity sensitive nano-photonics according to the first embodiment of the present disclosure; and FIG. 6 is an example of a holographic image and a reflective image formed by a humidity sensitive nano-photonics according to a modified example of the first embodiment of the present disclosure.

Hereinafter, with reference to FIGS. 1 to 6, humidity sensitive nano-photonics and a manufacturing method thereof according to a first embodiment of the present disclosure will be described in detail. A humidity sensitive nano-photonics 1000 according to the first embodiment of the present disclosure is composed of a plurality of unit modules 1100. The humidity sensitive nano-photonics 1000 includes a substrate 1200 and a metasurface 1300.

The substrate 1200 includes a plurality of unit cells 1210. The plurality of unit cells 1210 may be continuously assembled to form the substrate 1200. The substrate 1200 may be made of either silicon oxide (SiO₂) or hydrogenated amorphous silicon (a-Si:H).

A unit module 1100 is composed of a unit cell 1210 and a portion of a metasurface 1300 corresponding to the unit cell 1210, which are brought together to form a unit module.

In embodiments of the present disclosure, metamaterials may be understood as novel artificial materials that contain both electrical and magnetic elements that do not exist in natural. Further, in the embodiments of the present disclosure, the substrate 1200 and the metasurface 1300 may be understood to function as a metamaterial as a whole.

The metasurface 1300 includes a metasurface layer 1310 and a nanostructure 1320. The metasurface layer 1310 is disposed on one side of the substrate 1200. A plurality of nanostructures 1320 are provided on the metasurface layer 1310. The metasurface layer 1310 may be formed in a plate shape. Each of the nanostructure 1320 may be configured in the form of a protrusion on the metasurface layer 1310. The same material may be used to form the metasurface layer 1310 and the nanostructures 1320 in the metasurface 1300.

At least one unit cell 1210 and at least one nanostructure 1320 corresponding to the unit cell 1210 together form at least one unit module 1100.

The height of the nanostructure 1320 may be increased or decreased depending on the relative humidity of a surrounding environment. For example, the nanostructure 1320 may be modified to expand to increase its height when the relative humidity of a surrounding environment increases and to contract to decrease its height when the relative humidity of a surrounding environment decreases.

The nanostructure 1320 may be formed of polyvinyl alcohol (PVA) materials.

PVAs are synthetic polymeric material that are soluble in water. Because a PVA has the property of swelling when it absorbs water, it may expand or contract depending on the relative humidity of a surrounding environment. For example, the PVA-based nanostructure 1320 according to an embodiment of the present disclosure may swell at a maximum expansion rate of 35.5% dml depending on the relative humidity of a surrounding environment.

The nanostructure 1320 according to a first embodiment of the disclosure may be destroyed in an environment having a predetermined range of relative humidity. When the ambient relative humidity is greater than or equal to a predetermined value, the nanostructure 1320 according to the first embodiment of the present disclosure may be destroyed due to its maximum expansion. For example, the nanostructure 1320 may be destroyed when the ambient relative humidity is greater than or equal to 80%.

In particular, referring to FIG. 2, it can be seen that the nanostructures 1320 according to the first embodiment of the present disclosure can be formed with a very high aspect ratio.

(a) of FIG. 2 illustrates an example of a case where the nanostructure 1320 has a shape like a rectangular column. In this case, the height of the nanostructure 1320 is set to 500 nm. The width of the nanostructure 1320 may be formed to be from to be 50 nm to 200 nm, and the aspect ratio (height/width) of the nano structure 1320 may be formed to be a value of 10.

(b) of FIG. 2 illustrates an example of a case where the nanostructure 1320 has a cylindrical shape, and in this case, the height of the nanostructure 1320 is also set to 500 nm. It can be seen that the diameter of the nanostructure 1320 may be formed to be 150 nm to 850 nm, and the aspect ratio (height/width) of the nanostructure 1320 is close to a value of 7.

When the nanostructure 1320 is formed with a high aspect ratio, sufficient phases may be accumulated at the sub-wavelength scale, allowing for more effective encoding of local phases.

The formation of the nanostructures 1320 with a high aspect ratio may be attributed to the fact that the nanostructure 1320 is formed from PVA materials.

The metasurface 1300 may output at least one of a holographic image H and a reflective image R when light is incident thereon. The metasurface 1300 may output both the holographic image H and the reflective image R according to the type of light incident on the metasurface 1300, i.e., the metasurface 1300 may function as a multi-channel optical device.

When light from a first light source L1 is transmitted into the metasurface 1300, a preset holographic image H may be outputted. The first light source L1 may be monochromatic light. As shown in the right center of FIG. 3, it can be seen that a holographic image H of red, green, and blue of a preset shape (e.g., a key shape) is outputted when a laser of 635 nm, 532 nm, and 450 nm wavelengths is transmitted to the metasurface 1300.

When light from a second light source L2 is reflected on the metasurface 1300, a preset reflective image R may be outputted. The second light source L2 may be white light. As shown in the left center of FIG. 3, when the white light is incident on the metasurface 1300, it can be seen that, the incident light is reflected and a microscopic image of a preset shape (e.g., a QR code shape) that can be observed under a microscope is outputted as the reflective image R.

On the other hand, as shown in the lower right corner of FIG. 3, when the ambient relative humidity reaches 80%, it can be seen that the holographic image H is no longer outputted due to the destruction of the nanostructure 1320 of the metasurface 1300, even though the light from the first light source L1 is transmitted into the metasurface 1300.

Further, as can be seen in the lower left corner of FIG. 3, when the ambient relative humidity reaches 80%, the reflective image R is no longer outputted due to the destruction of the nanostructure 1320 of the metasurface 1300, even though the light from the second light source L2 is reflected on the metasurface 1300.

By utilizing the property that the nanostructure 1320 described above is destroyed in an environment having a predetermined range of ambient relative humidity, the humidity sensitive nano-photonics 1000 according to the first embodiment of the present disclosure may be used as a multi-channel optical encoding device that is capable of being irreversibly encoded in a specific relative humidity environment.

The humidity sensitive nano-photonics 1000 according to the first embodiment of the present disclosure may be manufactured by steps S1 through S6.

A step S1 is a step of preparing a master mold M. The master mold M may be prepared with the same shape as the shape of a target nanostructure 1320. The master mold M may be made of materials such as silicon oxide (SiO$_2$) and hydrogenated amorphous silicon (a-Si:H).

A step S2 is a step of preparing a soft mold S. The soft mold S may include a polydimethylsiloxane (PDMS) layer and a hard polydimethylsiloxane (h-PDMS) layer. In the step S2, the soft mold S may be made by casting the PDMS layer over the h-PDMS layer and curing it. Due to the high viscosity of the PDMS, pattern sizes smaller than 100 nm are known to be difficult to penetrate into the mold, making precise nanoscale replication difficult. However, the h-PDMS is a material with a lower viscosity than the PDMS, allowing for more precise nanoscale replication.

A step S3 is a step of imprinting the master mold M on one side of the soft mold S, and then detaching the master mold M from the soft mold S. Here, the one side of the soft mold S refers to the side with the h-PDMS layer. In other words, the master mold M is imprinted on the h-PDMS layer, and then the master mold M is detached so that a shape identical to that of the target nanostructure 1320 is engraved on the h-PDMS layer of the soft mold S.

A step S4 is a step of coating one side of the soft mold S with a PVA solution PL under pressure. This forms the metasurface 1300. The PVA solution PL is introduced into the engraved structure formed on one side of the soft mold S and cured to form the metasurface layer 1310 and the nanostructure 1320. In the step S4, before the PVA solution PL is coated on the soft mold S, the soft mold S may be treated with a hydrophobic coating.

A step S5 is a step of bringing the substrate 1200 into contact with the opposite side of the nanostructures 1320 on the metasurface 1300, and then applying heat to the substrate 1200, such that the metasurface 1300 is combined to the substrate 1200. The heat may be a low temperature heat. For example, the heat may be a low temperature heat of about 80 degrees Celsius. It may be advantageous that the PVA-based metasurface 1300 may be combined directly to the flexible polymer-based substrate 1200, as there is no need for a high temperature treatment as described above.

A step S6 is a step of detaching the soft mold S from the metasurface 1300 combined to the substrate 1200. The soft mold S may be more effectively separated from the metasurface 1300 if it is treated with a hydrophobic coating. Upon separation of the soft mold S, the nanostructure 1320 of the same shape as the master mold M may be formed on the metasurface layer 1310.

In particular, referring to FIG. 6, the humidity sensitive nano-photonics 1000 according to a modified example of the first embodiment of the present disclosure is described in detail. The humidity sensitive nano-photonics 1000 according to the modified example of the first embodiment of the present disclosure may control structural color using multiple meta-atom arrays. Here, a meta-atom may be used interchangeably with the nanostructure 1320. The nanostructure 1320 may expand to varying degrees based on its size-dependent swelling rate, which may induce distinct structural color differences under a relative humidity condition.

In the humidity sensitive nano-photonics 1000 according to the modified example of the first embodiment of the present disclosure, the substrate 1200 may be made of hydrogenated amorphous silicon (a-Si:H) materials.

In the upper portion of FIG. 6, structures of multiple meta-atom arrays labeled "Meta A" and "Meta B" are illustrated. "Meta A" and "Meta B" may refer to nanostructures 1320 having the same height but different widths. It can be seen that these multiple meta-atom array structures are destroyed in an environment with relative humidity of 80% (see, upper right of FIG. 6).

Similarly, in the middle of FIG. 6, three holographic images H are shown being destroyed in an environment with a relative humidity of 80%.

In the lower portion of FIG. 6, it can be seen that a reflective image R is initially unobservable due to its encoding, and then, while being exposed to a relative humidity of 80%, the reflective image R outputs the character 'PASSWORD', and after some time after being exposed to the relative humidity of 80%, it is encoded again so that the character 'PASSWORD' is no longer outputted. This could be due to the fact that 'Meta A' and 'Meta B' have different swelling rates due to the difference in volume. This may be because 'Meta A' and 'Meta B' expand at different rates as a result of having different volumes.

Figure 7:
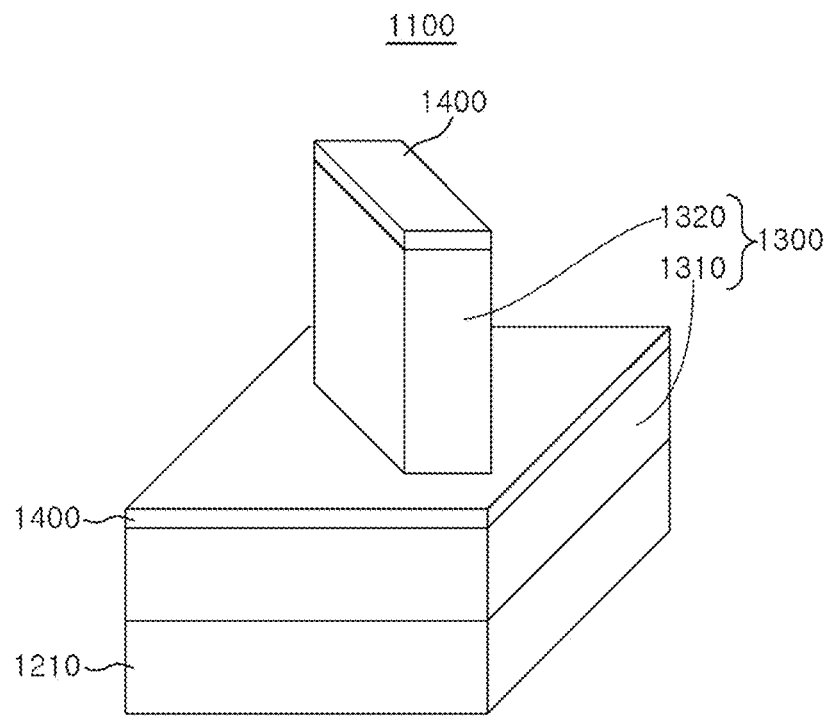
FIG. 7 is an enlarged perspective view of a unit module of humidity sensitive nano-photonics according to a second embodiment of the present disclosure.
Figure 8:
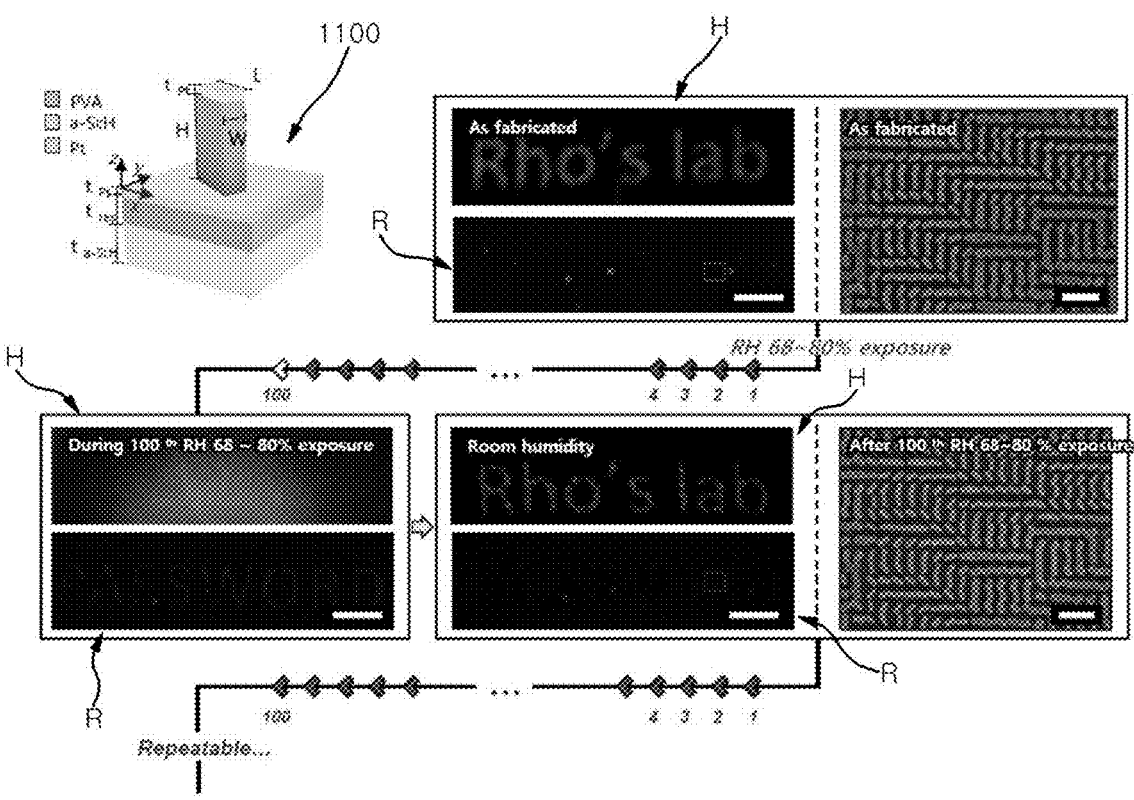
FIG. 8 is an example of a holographic image and a reflective image formed by the humidity sensitive nano-photonics according to the second embodiment of the present disclosure.
Figure 9:
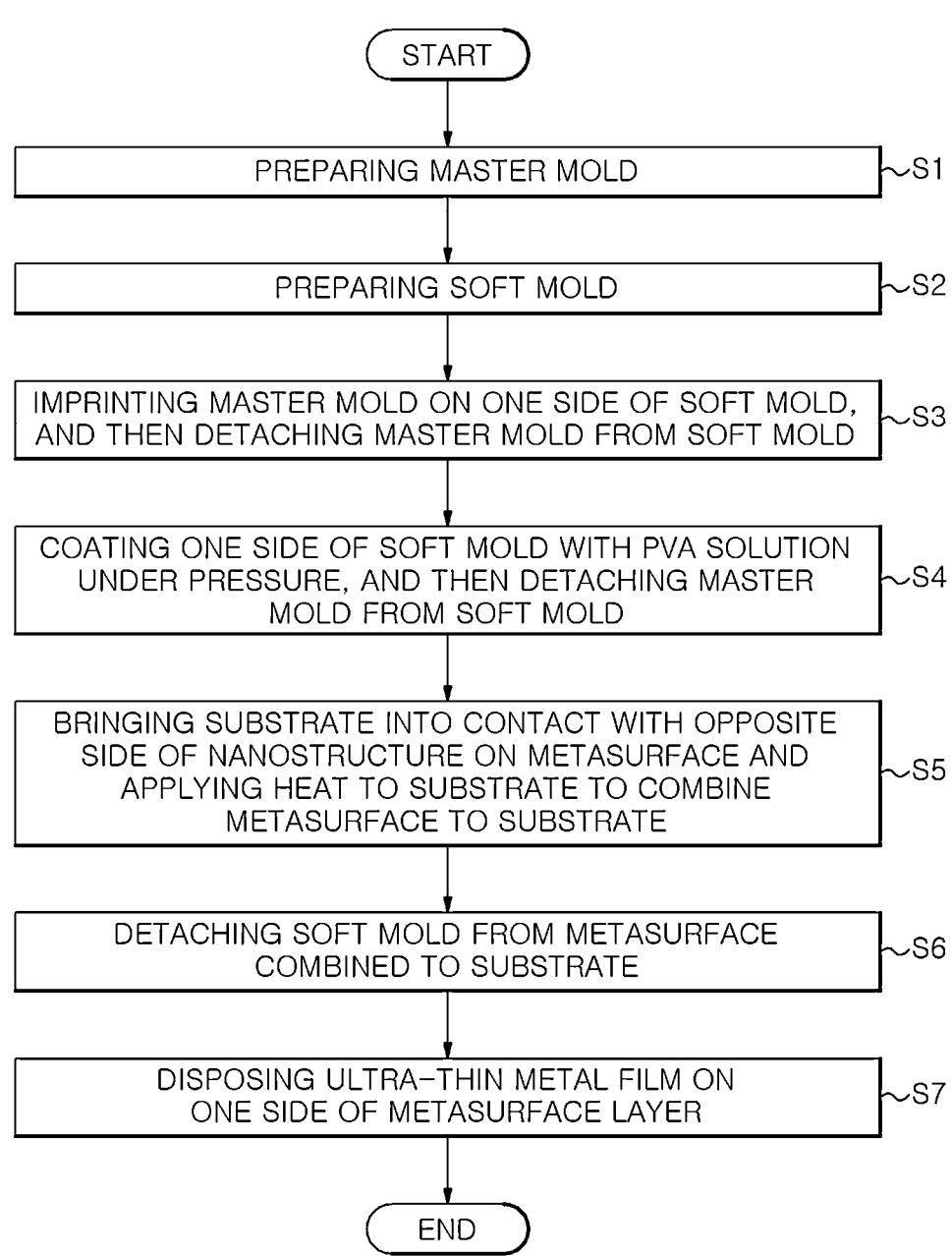
FIG. 9 is a flowchart illustrating a manufacturing method of the humidity sensitive nano-photonics according to the second embodiment of the present disclosure.

FIG. 7 is an enlarged perspective view of a unit module of humidity sensitive nano-photonics according to a second embodiment of the present disclosure; FIG. 8 is an example of a holographic image and a reflective image formed by the humidity sensitive nano-photonics according to the second embodiment of the present disclosure; and FIG. 9 is a flowchart illustrating a manufacturing method of the humidity sensitive nano-photonics according to the second embodiment of the present disclosure.

Hereinafter, with reference to FIGS. 7 to 9, the humidity sensitive nano-photonics according to the second embodiment of the present disclosure and a manufacturing method thereof will be described in detail. Hereinafter, descriptions that are redundant with the humidity sensitive nano-photonics and the manufacturing method thereof according to the first embodiment of the present disclosure will be omitted.

In the second embodiment of the present disclosure, the humidity sensitive nano-photonics 1000 has a nanostructure 1320 that may repeatedly change in height without being destroyed, even in an environment with repeatedly changing relative humidity.

The humidity sensitive nano-photonics 1000 according to the second embodiment of the present disclosure may further include a metal film 1400. The metal film 1400 may be disposed on one side of a metasurface layer 1310, which is an opposite side of a substrate 1200 relative to the metasurface layer 1310. Also, the metallic film 1400 may be provided to surround the perimeter of the nanostructures 1320.

The metal film 1400 is made of more rigid materials than the materials that make up the metasurface 1300. Therefore, the metal film 1400 that surrounds the nanostructure 1320 may be able to hold the nanostructure 1320 even when the metasurface 1300 expands, thereby preventing the nanostructure 1320 from being destroyed. For example, the metal film 1400 may be made of platinum (Pt) materials.

The metasurface 1300 according to the second embodiment of the present disclosure may output both a holographic image H and a reflective image R depending on the incident light. When the metasurface 1300 transmits light from a first light source L1, it may produce a preset holographic image H. When the metasurface 1300 reflects light from the second light source L2, it may produce a preset reflective image R. The first light source L1 may be monochromatic light. The second light source L2 may be white light.

The humidity sensitive nano-photonics 1000 according to the second embodiment of the present disclosure may decode one of the holographic image H or the reflective image R and encode the other under a first humidity range. The first humidity range may be a relative humidity range of 0 or more and less than 68%. For example, as shown in an upper portion of FIG. 8, it can be seen that under a condition of relative humidity less than 68%, the holographic image H is decrypted but the reflective image R is encoded.

The humidity sensitive nano-photonics 1000 may encode one of the holographic image H or the reflective image R and decode the other under a second humidity range. The second humidity range may be a range of at least 68% and no more than 80% relative humidity. For example, as shown in the lower left corner of FIG. 8, under a relative humidity of 68% or more and 80% or less, the holographic image H is encoded but the reflective image R is weakly decoded.

Then, when the relative humidity is less than 68% (at Room humidity), the holographic image H is again decoded and the reflective image R is encoded. In other words, when the relative humidity changes from the second humidity range back to the first humidity range, the metasurface 1300 is not destroyed and is restored to its previous state.

The manufacturing method of the humidity sensitive nano-photonics 1000 according to the second embodiment of the present disclosure may further include a step S7.

In the step S7, after the step S6, an ultra-thin metal film 1400 is disposed on one side of the metasurface layer 1310. As used herein, one side of the metasurface layer 1310 refers to a side of the metasurface layer 1310 facing the nanostructures 1320.

Figure 10:
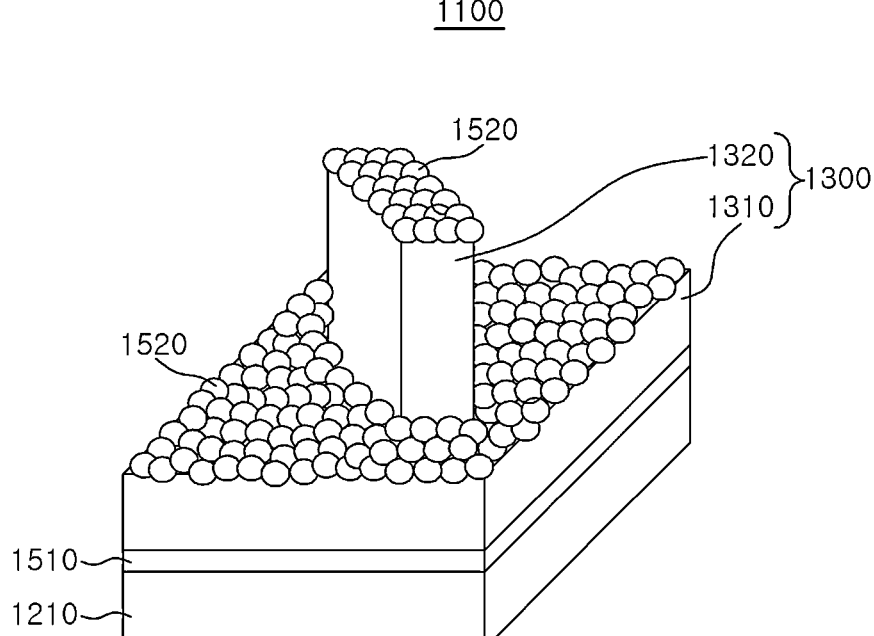
FIG. 10 is an enlarged perspective view of a unit module of humidity sensitive nano-photonics according to a third embodiment of the present disclosure.
Figure 11:
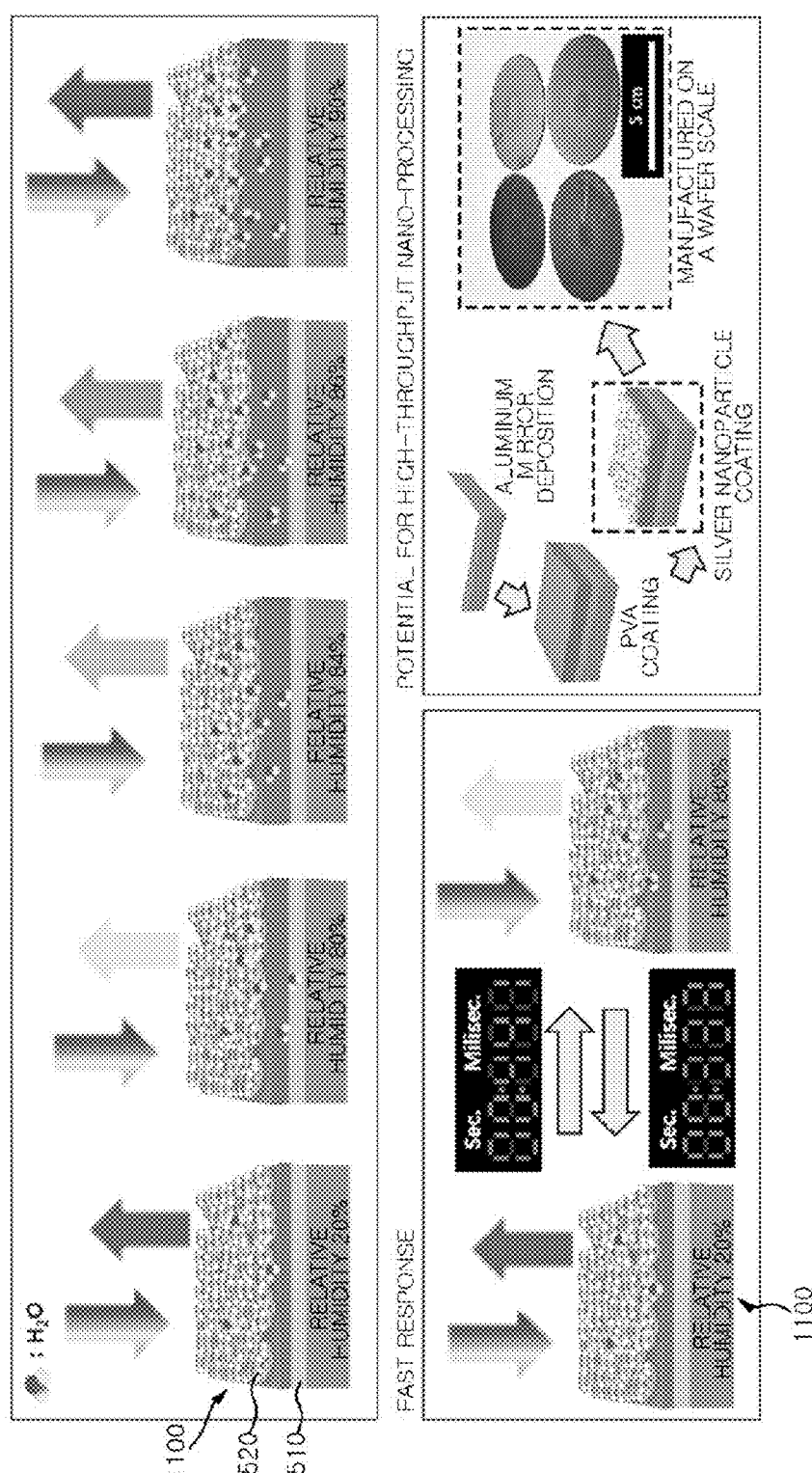
FIG. 11 is a conceptual diagram illustrating different colors being outputted by the humidity sensitive nano-photonics according to the third embodiment of the present disclosure.
Figure 12:
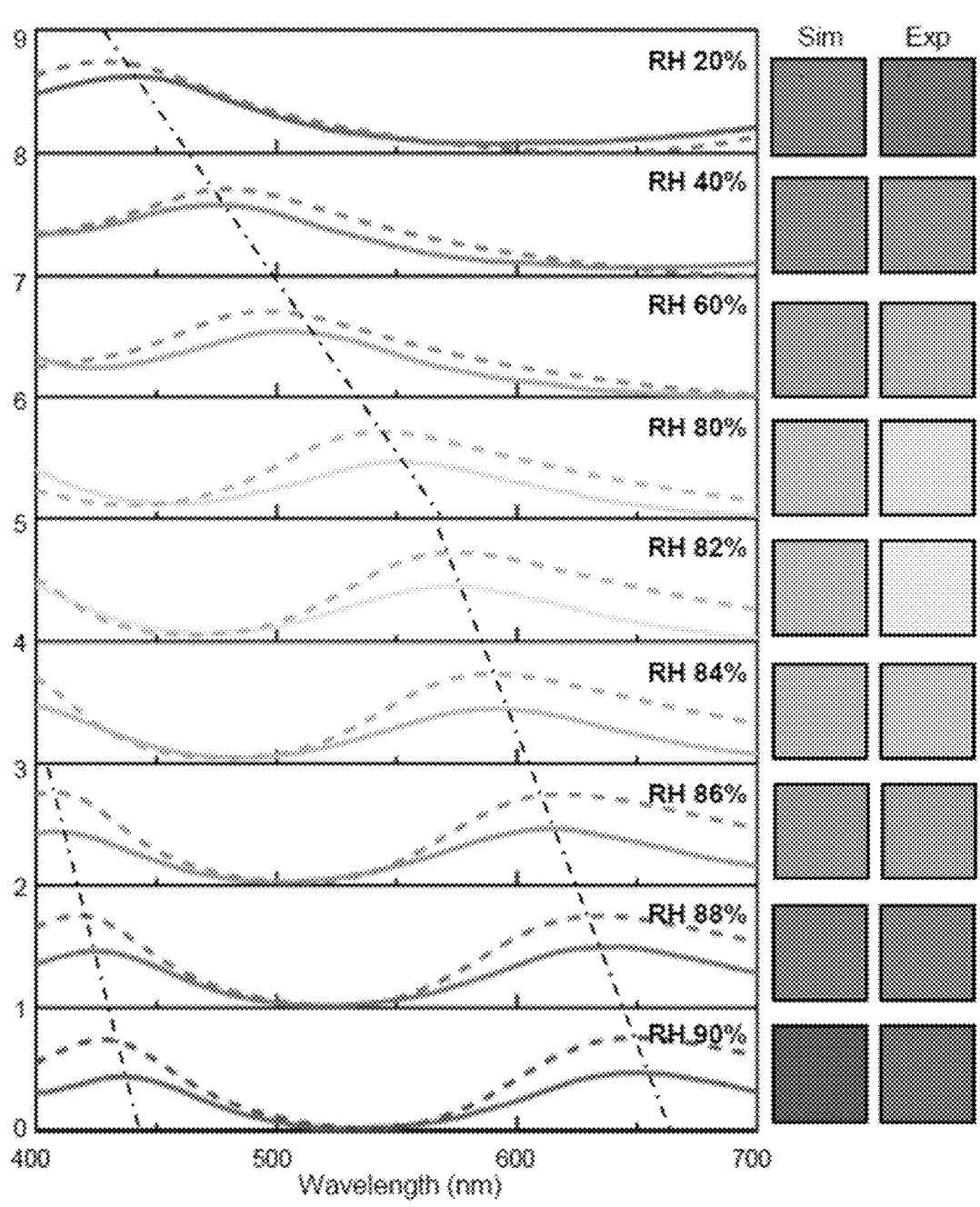
FIG. 12 is a graph illustrating that the humidity sensitive nano-photonics according to the third embodiment of the present disclosure outputs different wavelengths of light under different humidity conditions.
Figure 13:
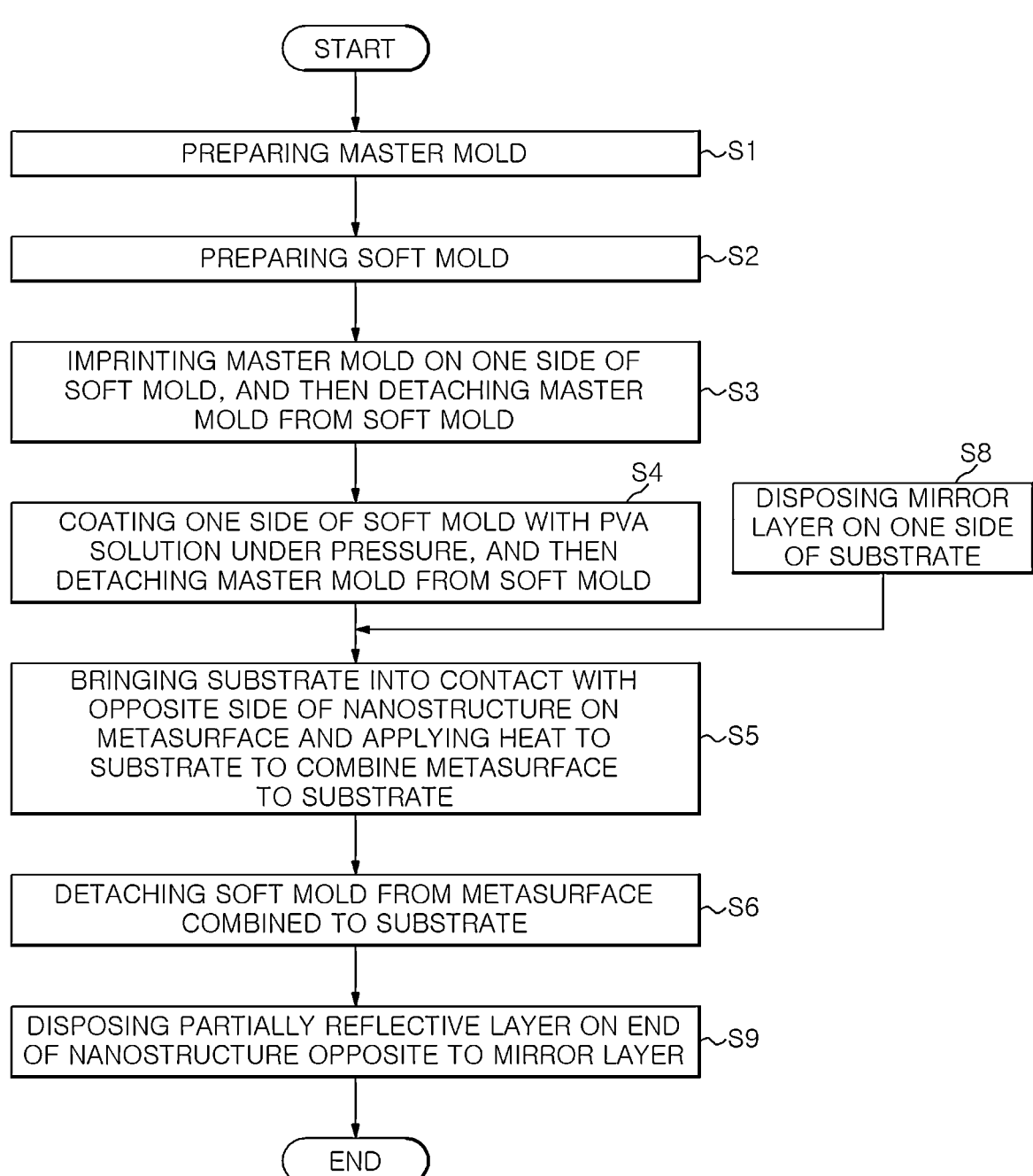
FIG. 13 is a flowchart illustrating a manufacturing method of the humidity sensitive nano-photonics according to the third embodiment of the present disclosure.
Figure 14:
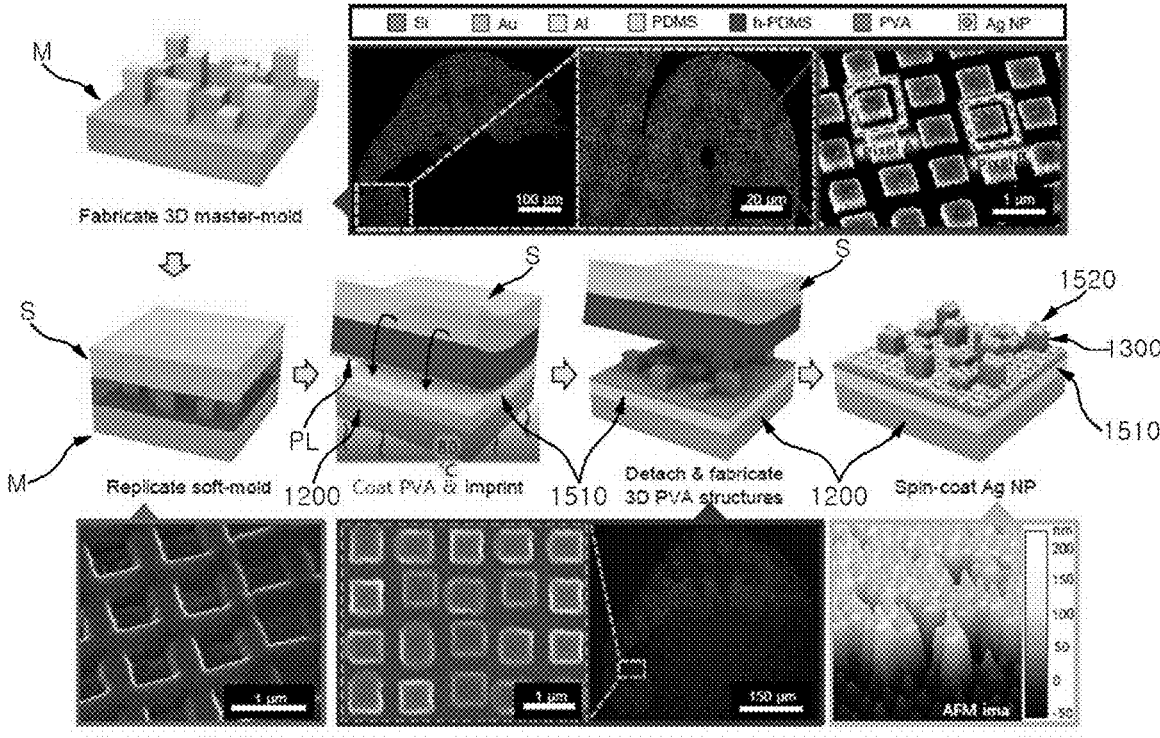
FIG. 14 is a conceptual diagram illustrating a manufacturing process of the humidity sensitive nano-photonics according to the third embodiment of the present disclosure.

FIG. 10 is an enlarged perspective view of a unit module of the humidity sensitive nano-photonics according to the third embodiment of the present disclosure; and FIG. 11 is a conceptual view illustrating different colors being outputted by the humidity sensitive nano-photonics according to the third embodiment of the present disclosure; FIG. 12 is a graph showing that the humidity sensitive nano-photonics according to the third embodiment of the present disclosure outputs different wavelengths of light under different humidity conditions; FIG. 13 is a flow chart illustrating a fabrication method of the humidity sensitive nano-photonics according to the third embodiment of the present disclosure; and FIG. 14 is a conceptual diagram illustrating a manufacturing process of the humidity sensitive nano-photonics according to the third embodiment of the present disclosure.

Hereinafter, with reference to FIGS. 10 to 14, the humidity sensitive nano-photonics according to the third embodiment of the present disclosure and the manufacturing method thereof will be described in detail. Hereinafter, descriptions that are redundant with the humidity sensitive nano-photonics and production method according to the first embodiment of the present disclosure will be omitted.

The humidity sensitive nano-photonics 1000 according to the third embodiment of the present disclosure further includes a mirror layer 1510 and a partially reflective layer 1520, wherein different colors of light may be outputted depending on the ambient relative humidity condition when light is incident on the metasurface 1300.

The mirror layer 1510 is a layer disposed between the substrate 1200 and the metasurface layer 1310 to reflect incident light. The mirror layer 1510 may be formed of aluminum (Al) materials.

The partially reflective layer 1520 is disposed on an end of the nanostructure 1320 opposite to the mirror layer 1510, such that a portion of the incident light is reflected and the remaining portion is transmitted. The partially reflective layer 1520 may be a silver nanoparticle coating layer coated with silver nanoparticles. The silver nanoparticles may be formed with a particle size of 20 to 40 nm. The partially reflective layer 1520 may also comprise a silver nanoparticle film. The silver nanoparticle film may comprise 8.5% silver by weight, and the film may be formed with a thickness of up to 70 nm.

In the unit module 1100, the mirror layer 1510 and the partially reflective layer 1520 corresponding to the unit cell 1210 together forming the unit module 1100.

When light is incident on the metasurface 1300, it passes through the nanostructures 1320 and the metasurface layer 1310 and is reflected by the mirror layer 1510, and the light reflected by the mirror layer 1510 is partially reflected back by the partially reflective layer 1520 and partially passed to the outside. In this process, different colors of light are outputted from the nanostructures 1320 at different heights due to resonance by the Febry-Perot phenomenon.

The nanostructures 1320 may expand and contract depending on the relative humidity conditions of the environment, so that their height may be increased or decreased depending on the relative humidity conditions of the environment. Thus, the humidity sensitive nano-photonics 1000 according to the third embodiment of the present disclosure may be able to output different colors of light under different relative humidity conditions.

Meanwhile, in FIG. 10, the nanostructure 1320 is illustrated as being formed in the shape of a rectangular pillar, but the nanostructure 1320 of the humidity sensitive nanophotonics 1000 according to the third embodiment of the present disclosure may be formed in the shape of a square pillar. For example, the cross-section of the nanostructure 1320 may be manufactured as a square with a size of 700*700 nm$^2$, forming a square pixel structure. However, the shape of the nanostructures 1320 is not limited to this.

In the upper portion of FIG. 11, the color of the outputted light is conceptually illustrated to vary depending on the relative humidity conditions. In the lower left corner of FIG. 11, the time required to change the color outputted from the metasurface 1300 when the relative humidity changes from 20% relative humidity to 80% relative humidity is shown to be between 333 milliseconds and 441 milliseconds, indicating that the response is very fast. Furthermore, the humidity sensitive nano-photonics 1000 according to the third embodiment of the present disclosure may also be manufactured on a wafer scale, as shown in the lower right corner of FIG. 11.

FIG. 12 illustrates an example of different colors of light being outputted depending on different relative humidity conditions. Sim is the predicted color and Exp is the experimentally measured color. Similarly, the dashed line in the graph is the predicted spectrum and the solid line is the experimentally measured spectrum. The numbers 1 through 9 on the left denote separators, and the horizontal axis denotes the wavelength. By connecting the peak values of the experimental light spectrum at each relative humidity condition (dashed lines), it can be seen that the wavelength of the peak increases as the relative humidity increases.

By utilizing the property that the wavelength of the outputted light changes depending on the relative humidity condition as described above, the humidity sensitive nano-photonics 1000 according to the third embodiment of the present disclosure may be designed such that each of the unit modules 1100 outputs light in a wavelength range of a full RGB gamut.

Meanwhile, in any two of the unit modules 1100, the nanostructures 1320 of one of the unit modules 1100 and the nanostructures 1320 of the other of the unit modules 1100 may have different heights when initially formed, according to the third embodiment of the present disclosure. In this case, under the same relative humidity conditions, the nanostructures 1320 having different heights may be capable of outputting different colors of light, thereby forming an initial pattern with different colors.

The manufacturing method of the humidity sensitive nano-photonics 1000 according to the third embodiment of the present disclosure may further include steps S8 and S9.

A step S8 is a step in which the mirror layer 1510 is disposed on one side of the substrate 1200. The step S8 may occur prior to the step S5. For example, the step S5 may be a step of contacting the mirror layer 1510 on the opposite side of the nanostructures 1320 of the metasurface 1300, such that the mirror layer 1510 is disposed between the metasurface 1300 and the substrate 1200, and then applying heat to the substrate 1200, such that the metasurface 1300 is combined to the mirror layer 1510.

A step S9 may be a step in which the partially reflective layer 1520 is disposed on an end of the nanostructure 1320 opposite to the mirror layer 1510 of the nanostructure 1320 after the step S6. The partially reflective layer 1520 may be disposed by a deposition method.

While embodiments of the present disclosure have been described above, these are only exemplary embodiments, and the present disclosure should be construed in the broadest scope based on the basic technical ideas disclosed herein, rather than as being limited to them. By combining or substituting a part or parts of the embodiments disclosed herein, the ordinary skilled in the art may carry out an embodiment which is not explicitly described herein, but it should be noted that it shall not depart from the scope of the patent right of this disclosure. Further, the ordinary skilled in the art may readily change or modify the embodiments disclosed herein based on this disclosure, and however, it is understood that such changes or modifications will also fall within the scope of the patent right of this disclosure.

REFERENCE SIGNS LIST

1000: Humidity sensitive nano-photonics
1100: Unit module
1200: Substrate
1210: Unit cell
1300: Metasurface
1310: Metasurface layer
1320: Nanostructure
1400: Metal film
1510: Mirror layer
1520: Partially reflective layer
H: Holographic image
L1: 1st light source
L2: 2nd light source
M: Master mold
PL: PVA solution
R: Reflective image
S: Soft mold

What is claimed is:

1. Humidity sensitive nano-photonics comprising:
a substrate including a plurality of unit cells; and
a metasurface including a metasurface layer disposed on one side of the substrate and a plurality of nanostructures provided on the metasurface layer and forming a geometric pattern,
wherein one of the unit cells and at least one of the nanostructures corresponding to the unit cell together constitute a unit module;
wherein the height of the nanostructures is able to increase or decrease depending on ambient relative humidity,
wherein when the metasurface transmits light from a first light source, it may produce a preset holographic image; and
when the metasurface reflects light from the second light source, it may produce a preset reflective image.

2. The humidity sensitive nano-photonics according to claim 1, wherein the metasurface is formed of polyvinyl alcohol (PVA) materials that expand or contract depending on the ambient relative humidity.

3. The humidity sensitive nano-photonics according to claim 1, wherein the nanostructure is destroyed in an environment with a predetermined range of ambient relative humidity.

4. The humidity sensitive nano-photonics according to claim 3, wherein the nanostructure is destroyed in an environment with ambient relative humidity of 80% or more.

5. The humidity sensitive nano-photonics according to claim 1, wherein the nanostructure has an aspect ratio of 2.5 to 10.

6. The humidity sensitive nano-photonics according to claim 1, wherein the substrate is formed of hydrogenated amorphous silicon (a-Si:H) materials.

7. The humidity sensitive nano-photonics according to claim 1, wherein the nanostructure is capable of repeatedly changing in height without being destroyed even in an environment with repeatedly changing relative humidity.

8. The humidity sensitive nano-photonics according to claim 7, wherein an ultra-thin metal film is disposed on one side of the meta-surface layer, which is an opposite side of the substrate relative to the meta-surface layer; and the metal film is provided to surround the perimeter of the nanostructure.

9. The humidity sensitive nano-photonics according to claim 7, wherein when the metasurface transmits light from a first light source, it may produce a preset holographic image; and when the metasurface reflects light from the second light source, it may produce a preset reflective image, and wherein one of the holographic image or the reflective image is decoded while the other is encoded under a first humidity range, and one of the holographic image or the reflective image is encoded while the other is decoded under a second humidity range.

10. The humidity sensitive nano-photonics according to claim 9, wherein the first humidity range is a relative humidity range of 0 or more and less than 68, and the second humidity range is a relative humidity sensitive range of 68% or more and 80% or less.

11. The humidity sensitive nano-photonics according to claim 1, further comprising:

a mirror layer disposed between the substrate and the metasurface layer to reflect incident light;

a partial reflective layer disposed at an opposite end of the mirror layer of the nanostructure to reflect a portion of the incident light and transmit the remaining portion, wherein in the unit, the mirror layer and the partially reflective layer corresponding to the unit cell together constitute the unit;

different colors of light are outputted depending on ambient relative humidity when light is incident on the unit.

12. The humidity sensitive nano-photonics according to claim 11, wherein the mirror layer is made of aluminums (Al).

13. The humidity sensitive nano-photonics according to claim 11, wherein the partial reflective layer is a silver nanoparticle coating layer.

14. The humidity sensitive nano-photonics according to claim 11, wherein in the unit module, a wavelength of an outputted light covers a wavelength range of a full RGB gamut.

15. The humidity sensitive nano-photonics according to claim 11, wherein in any two of the unit units, the nanostructure of one of the unit units and the nanostructure of the other of the unit units have different heights when formed initially.

* * * * *